UNITED STATES PATENT OFFICE.

HENRY A. WEBER AND MELVILL A. SCOVELL, OF URBANA, ILLINOIS.

MANUFACTURE OF GLUCOSE.

SPECIFICATION forming part of Letters Patent No. 250,117, dated November 29, 1881.

Application filed October 10, 1881. (Specimens.)

*To all whom it may concern:*

Be it known that we, HENRY A. WEBER and MELVILL A. SCOVELL, citizens of the United States, and residents of the city of Urbana, county of Champaign, and State of Illinois, have invented a Method for the Manufacture of Starch and Glucose from the Seed of Sorghum-Cane; and we do hereby declare that the following is a clear and exact description of the invention, which will enable others skilled in the art to which it appertains to make and use the same.

Heretofore glucose has been made from the starch of corn, rice, and other grains by converting the starch, by means of sulphuric acid, into uncrystallizable sugar or glucose and eliminating the excess of acid by converting it into an insoluble sulphate and filtering from the glucose solution.

Our invention consists in producing starch and glucose (starch sugar) from the seeds of sorghum, imphee, and similar plants.

The seed of sorghum is ground to coarse flour, mixed to a thin paste with water, and then allowed to run into a hot mixture of water and sulphuric acid, and boiled until a portion of the solution taken out no longer gives a precipitate of dextrine when mixed with three or four volumes of alcohol. This operation will require two to six hours boiling. Instead of open converters, closed vessels may be used, and the mixture obtained above heated to about 110° centigrade. In this case the conversion of starch into glucose will take in an hour or less. After the conversion of starch into glucose by either method just given the solution is filtered off and the insoluble residue exhausted with water. The thin solution of glucose and sulphuric acid thus obtained is treated with an excess of calcium carbonate in the form of powdered marble, chalk, or limestone, or of common whiting, and evaporated to the consistency of sirup. The insoluble calcium sulphate, with the excess of calcium carbonate, is either allowed to subside or is filtered off. The sirup is next passed through bone-black filters for decolorization, and, if necessary, is further concentrated to the proper consistency.

The proportion of sulphuric acid, water, and ground seed is as follows: ground seed, mixed to a thin paste with water, one hundred pounds; sulphuric acid, two to eight pounds; water, twenty to forty gallons.

The composition of sorghum-seed, according to our analysis, is as follows in one hundred parts:

| | |
|---|---|
| Cane-sugar | 0.56 |
| Starch | 63.09 |
| Tannin | 5.42 |
| Fiber | 6.35 |
| Water | 12.51 |
| Ash | 0.64 |
| Albuminoids | 7.35 |
| Oil | 3.08 |
| Total | 99.00 |

From the process just described it will be seen that not only the starch, but also the sugar and tannin, and possibly a portion of the fiber, is utilized in the production of glucose.

Instead of treating the ground seed as described, the starch contained in the seed may be prepared and glucose manufactured from it by substituting it for the ground seed in the process mentioned above. To prepare the starch the seed is soaked for several days in water and crushed. The crushed seed is washed upon sieves with water. The water, which carries the starch with it, is allowed to run into settling-vats, where the starch subsides. The supernatant liquor is then drawn off, and, if necessary, the starch washed with fresh portions of water. The moist starch, which settles at the bottom of the vats, is ready for conversion into glucose. For this purpose it is mixed to a thin paste with water, and then run into a hot mixture of water and sulphuric acid in the proportions mentioned for the preparation of glucose from ground seed, and is further treated in the same manner as above described for making glucose from the ground seed.

Having thus fully described our invention, we claim—

1. The manufacture of glucose from the seed of the *Sorghum saccharatum*.

2. The manufacture of starch and sugar from the seeds of the sorghum-plant by treating the same substantially as set forth.

3. The application of the seeds of the sorghum-plant to the manufacture of starch and sugar, substantially as set forth.

HENRY A. WEBER.
MELVILL A. SCOVELL.

Witnesses:
P. M. ENDSLEY,
J. B. STURMAN.